Figures 1, 5, 6:
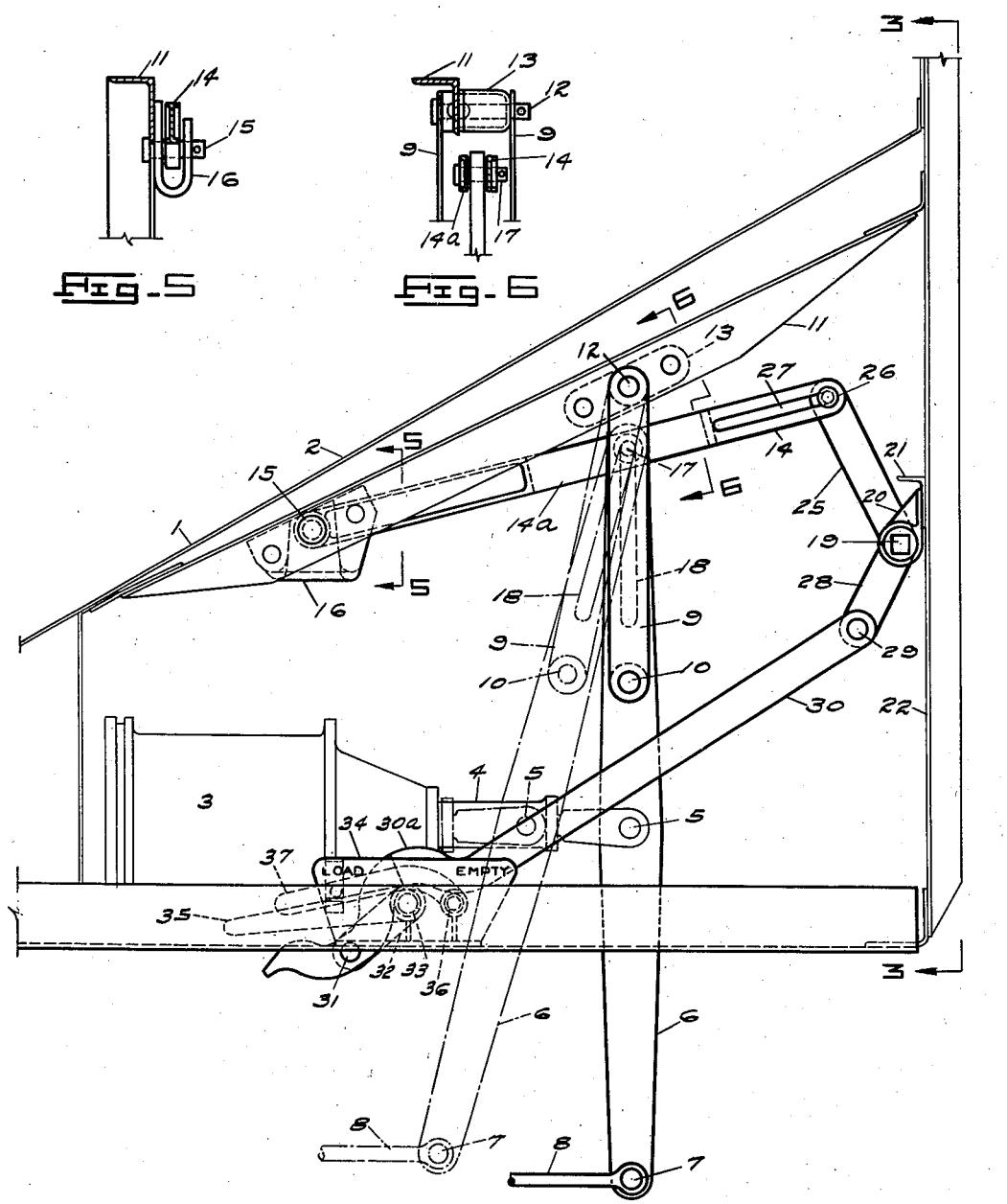

Dec. 1, 1936.    G. A. SUCKFIELD    2,062,533

CAR BRAKE

Filed Oct. 22, 1935    3 Sheets-Sheet 1

INVENTOR
George A. Suckfield.
BY
E. Statler
ATTORNEY

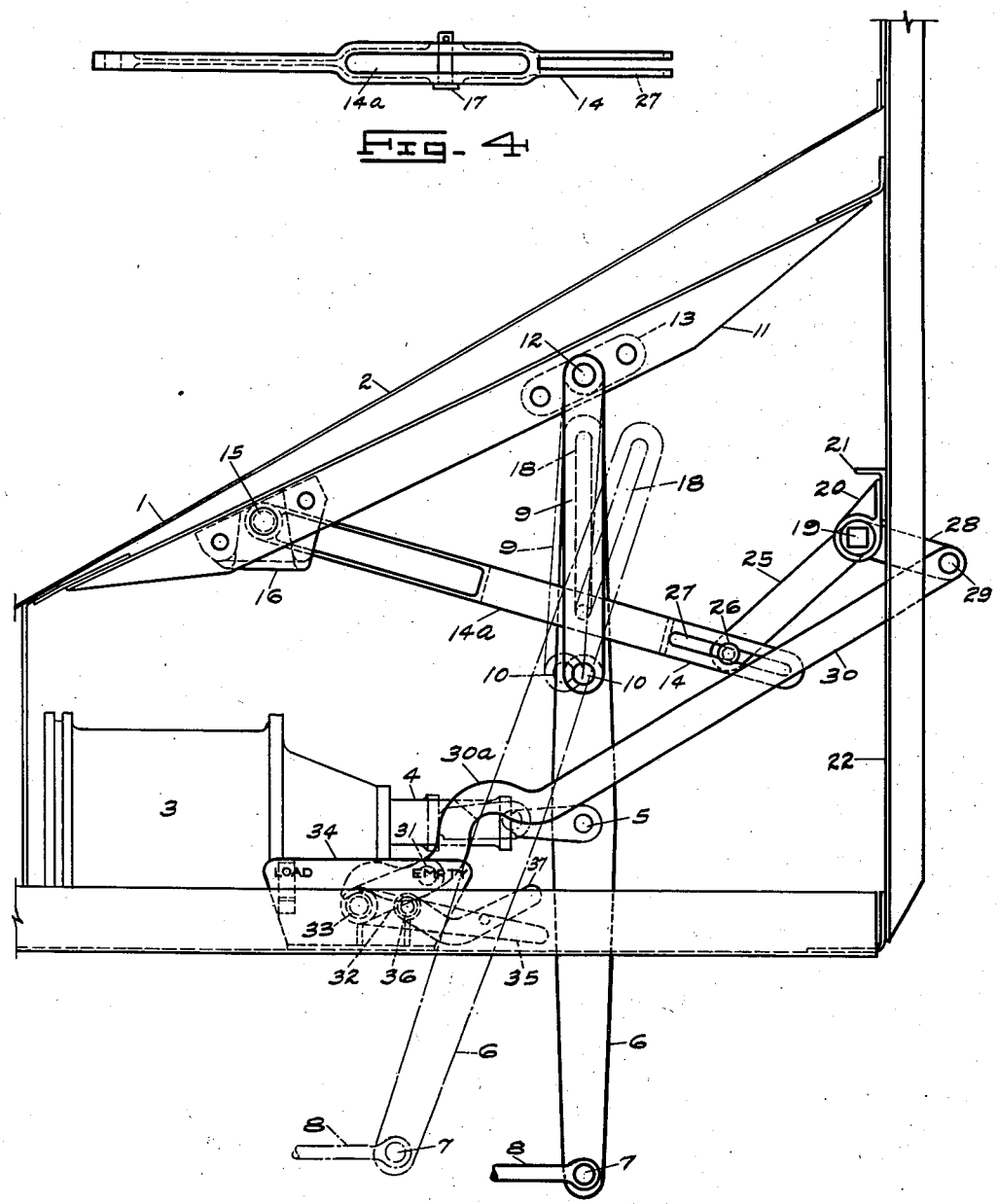

Dec. 1, 1936.   G. A. SUCKFIELD   2,062,533
CAR BRAKE
Filed Oct. 22, 1935   3 Sheets-Sheet 3
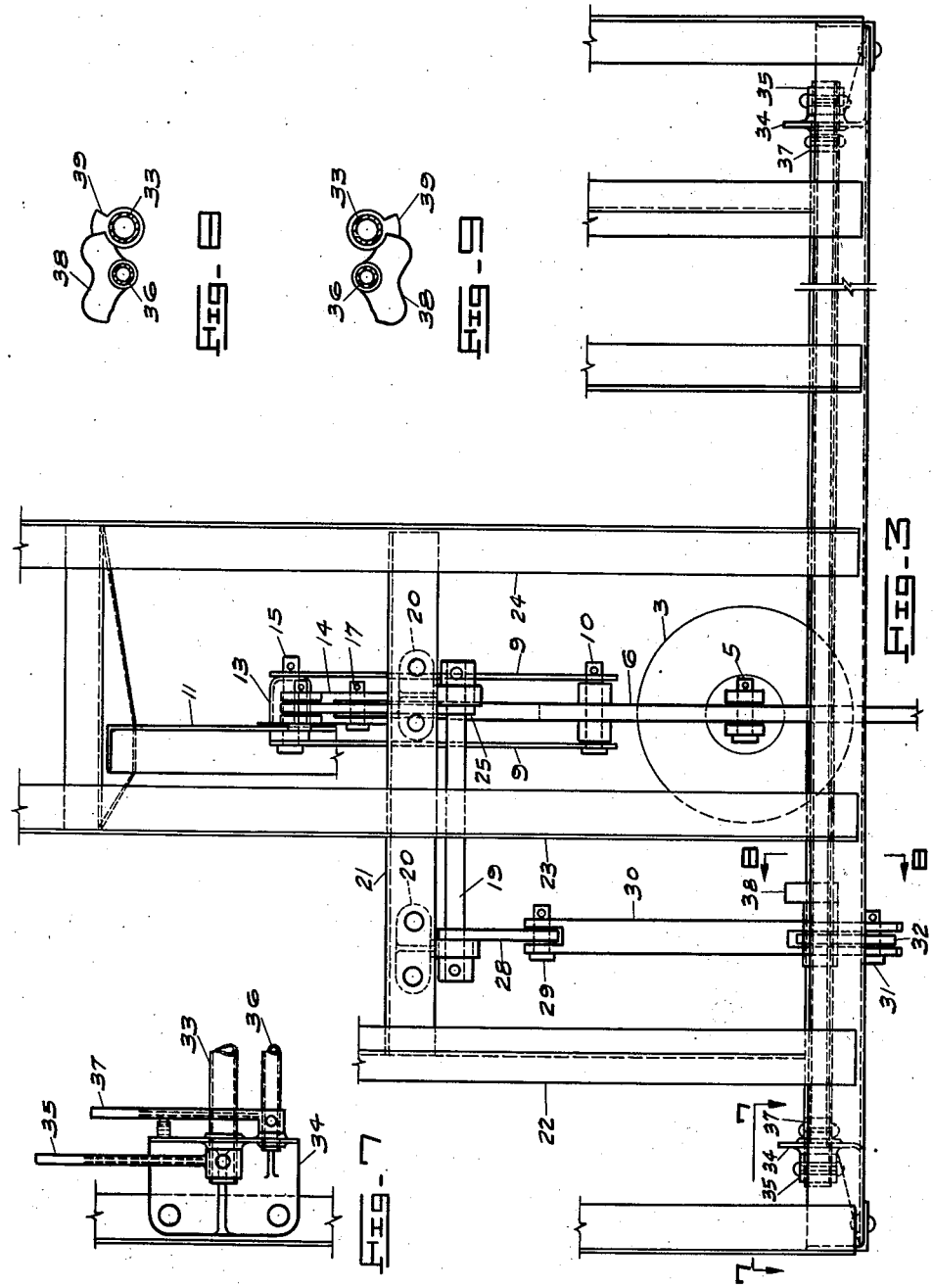
INVENTOR
George A. Suckfield.
BY
ATTORNEY Patented Dec. 1, 1936

2,062,533

UNITED STATES PATENT OFFICE 2,062,533

CAR BRAKE

George A. Suckfield, Avalon, Pa., assignor to Pressed Steel Car Company, Pittsburgh, Pa., a corporation of New Jersey Application October 22, 1935, Serial No. 46,225

5 Claims. (Cl. 188—195)

With the increase of braking power necessitated by the modern design of railway cars carrying such large loads of lading, a brake of sufficient power to stop a loaded car tends to slide the wheels of the car when empty, thereby causing flat spots in the wheels necessitating their removal.

Another fault of the brake which exerts the same retarding effort to a loaded and empty car manifests itself when an empty car is placed between loaded cars in a train whereby upon an application of the brakes the empty car decelerates more rapidly than the loaded cars thereby causing a tendency of the train to buckle with consequent injury to the empty car.

An object of the invention is to provide the braking system of a car with means whereby the braking system may be manually set for an "empty" or "load" application of the brakes.

Another object of the invention is to provide a means for varying the fulcrum point of the brake cylinder lever prior to the application of the air brakes to obtain an "empty" or "load" application of the brake.

Another object of the invention is to provide a means whereby the manual selective device may be operated when the brakes are in released or applied position.

Referring now to the drawings, Fig. 1 shows a portion of the side elevation of a railway car of the hopper type embodying the invention, which is set for a "load" application of the brakes; Fig. 2 shows a view similar to that shown by Fig. 1 with the invention set for an "empty" application of the brakes; Fig. 3 shows an end view of the car and the invention; Fig. 4 shows a detail view of the fulcrum change over arm; Figs. 5 and 6 show sections on lines 5—5 and 6—6 of Fig. 1; Figs. 7, 8 and 9 show sections taken on lines 7—7 and 8—8 of Fig. 3.

Referring now in detail to the drawings where like reference characters refer to like parts, reference character 1 indicates the body of the car having a sloping end floor 2 with a brake cylinder 3 disposed adjacent the end of the car beneath the sloping floor. A fluid pressure actuated piston 4 in the brake cylinder has a bifurcated end portion connected by the pin 5 to a substantially vertically disposed brake lever 6. The lower end of the brake lever 6 is pivotally connected by pin 7 to a pull rod 8 actuating the usual brake shoes (not shown). The brake lever 6 is suspended from the car by means of a hanger comprising spaced arms 9 pivotally connected at the lower end, by means of the pin 10, to the brake lever 6 and pivotally connected adjacent their upper end to the member 11 by means of the pin 12 journaled in the bearing 13 secured to the member 11.

A fulcrum change over arm 14 which is disposed between the arms 9 of the hanger has its inner end pivotally mounted on the pin 15 journaled in the bearing 16 mounted on the member 11. The intermediate portion of the arm 14 is bifurcated at 14ª and the brake lever 6 is disposed between the bifurcations. A fulcrum pin 17 connects the bifurcated portions 14ª of the arm 14 and the lever 6, and is adapted to move longitudinally of the member 6 within an aperture 18 formed in the lever 6. The upper end of the aperture serves as a bearing for the pin 17 and a fulcrum point for the lever 6 when a "load" application of the brake is made, the lower end of the aperture forms a bearing for the pin 17 and a fulcrum point for the lever 6 when an "empty" application of the brake is made.

For the purpose of manipulating the arm 14 a shaft 19 is disposed transversely of the car adjacent the end thereof and journaled in bearings 20 secured to the member 21 mounted on end posts 22, 23, and 24. Mounted on the shaft 19 and rigid therewith is a crank 25, pivotally connected to the arm 14 by means of pin 26 moving in the aperture 27 formed in the arm 14 adjacent one end thereof. A crank 28 rigid with shaft 19 is pivotally connected by means of a pin 29 to the lever 30 serving to actuate the shaft 19. The lower end of the lever 30 is pivotally connected by means of the pin 31 to a crank 32 rigidly mounted on a shaft 33 extending transversely of the car and journaled in bearings 34 adjacent each side of the car. The lever 30 has an offset portion 30ª within which the shaft 33 is disposed. Rigid with the shaft 33 adjacent each end thereof is a hand lever 35 for the purpose of manipulating the shaft. Extending transversely of the car adjacent the shaft 33 is a shaft 36 having operating handles 37 mounted adjacent each end thereof. A latching device 38 rigid with the shaft 36 extends on each side of the shaft so that its end portions selectively engage an abutment 39 rigidly mounted on the shaft 33 serving to lock the change over device in its respective positions.

The theory of operation of the invention is as follows: the brake cylinder lever is suspended from the car by means of the hanger. The hanger, is pin connected to the car and to the lever to permit relative pivotal movement between the hanger, the car and lever. The change over arm has a pivot pin selectively engaging the extremities of an aperture in the brake cylinder lever to provide a fulcrum for the lever when the latter is actuated by brake cylinder piston 4.

The operation of the described specific embodiment of the invention is as follows: when it is desired to make a "load" application of the brakes the mechanism is placed in the position shown in Fig. 1 of the drawings wherein the lever 14 is in its upper position and the pin 17 therein is in the upper extremity of the aperture 18 of lever 6 serving as a fulcrum for the latter. When fluid pressure is applied to the brake cylinder the outward movement of the cylinder piston 4 carries with it the lever 6 and the hanger arms 9 until the lever 6 fulcrums about the fulcrum pin 17 to cause tension in the pull rod 8 and applying the brakes. Upon release of the fluid pressure in the cylinder the brakes cause lever 6 to move inwardly to the position show in Fig. 1.

When it is desired to obtain an "empty" application of the brakes the handle 37 of Fig. 1 is rotated in a clockwise direction through an angle of 45° freeing latch 38 on shaft 36 from abutment 39 of shaft 33 of Fig. 8. Handle 35 is now rotated in a clockwise direction, moving abutment 39 into position shown by Fig. 9, thereafter handle 37 is rotated into position shown by Fig. 2, moving latch 38 into engagement with abutment 39, locking handle 35 against rotation. Handle 35 is rotated in a clockwise direction thereby actuating the lever 30 through crank 32 to bring the lower end of lever 30 into engagement with the shaft 33 to prevent further rotation of the handle 35 as shown in Fig. 2 of the drawings. This movement of the lever 30 causes a counter-clockwise movement of the crank 28 bringing the arm 25 and arm 14 downward until the fulcrum pin 17, within the arm 14, seats in the lower bearing of the aperture 18 in the lever 6. With the mechanism in this position, when the brakes are applied the outward movement of the piston 4 carriers the brake lever 6 outwardly, causing it to fulcrum on the pin 17 leaving the upper end of the lever 6 to pass freely between the arms 9 of the hanger.

Having thus described the invention what I claim as new and desire to secure by Letters Patent is:

1. In an empty and load brake for a railway car, in combination, a brake lever having a connection intermediate its ends to a brake cylinder, a support for said lever on the car, a connection between the lever and support inwardly of one end of the lever, a fulcrum change over arm movably mounted on the car and having a bifurcated portion enclosing one end of the lever, and a fulcrum pin for said lever mounted in said bifurcated portion of the change over arm and engaging the lever.

2. In an empty and load brake for a railway car, in combination, a brake lever having a connection intermediate its ends to a brake cylinder, a support for the lever on the car, a connection between the lever and support adjacent one end of the lever, and means including a fulcrum member movably mounted on the car and engaging the lever at a plurality of points thereon outwardly of the connection between the lever and support.

3. In an empty and load brake for a railway car, in combination, a brake lever having a connection intermediate its ends to a brake cylinder, a support on said car for said lever, a connection between said support and lever permitting movement between the support and lever, and a fulcrum means for one end of the lever including a member movable longitudinally of the lever and engaging therewith.

4. In an empty and load brake for a vehicle, in combination, a brake lever, a brake cylinder, a brake rod, connections between the brake lever, the brake cylinder and the rod, a connection between the lever and vehicle by means of a member having spaced pivotal connections to the lever and vehicle, and a movable abutment selectively engaging the lever at a plurality of points in the length thereof to form a fulcrum for the lever when actuated by the brake cylinder.

5. In an empty and load brake for a vehicle, in combination, a brake lever, a brake cylinder, a brake rod, connections between the brake lever, the cylinder and the rod, and a connection between the lever and vehicle by means of a member having spaced pivotal connections to the vehicle and lever, a slot in said lever intermediate said pivotal connections, a fulcrum pin for the lever disposed in said slot and means for moving the fulcrum pin within the slot to provide a variable fulcrum for the lever when actuated by said cylinder.

GEORGE A. SUCKFIELD.